United States Patent [19]
Ito et al.

[11] Patent Number: 5,578,688
[45] Date of Patent: Nov. 26, 1996

[54] ANTIFOULING AGENT

[75] Inventors: Katsuji Ito; Satoshi Kamata; Toshiro Goto, all of Yokohama, Japan

[73] Assignee: Asahi Glass Company Ltd., Tokyo, Japan

[21] Appl. No.: 497,844

[22] Filed: Jul. 3, 1995

Related U.S. Application Data

[63] Continuation of Ser. No. 217,101, Mar. 24, 1994, abandoned.

[30] Foreign Application Priority Data

Mar. 24, 1993 [JP] Japan .................................. 5-089281

[51] Int. Cl.[6] .................................................. C08F 18/20
[52] U.S. Cl. ............................................................ 526/245
[58] Field of Search .............................................. 526/245

[56] References Cited

U.S. PATENT DOCUMENTS

| | | | |
|---|---|---|---|
| 4,859,754 | 8/1989 | Itoh et al. . | |
| 5,057,577 | 10/1991 | Matsuo et al. . | |
| 5,068,295 | 11/1991 | Misaizu et al. | 526/245 |
| 5,081,165 | 1/1992 | Inukai et al. | 526/245 |
| 5,100,954 | 3/1992 | Maekawa . | |

FOREIGN PATENT DOCUMENTS 0383310  8/1990  European Pat. Off. .

*Primary Examiner*—Joseph L. Schofer
*Assistant Examiner*—N. Sarofim
*Attorney, Agent, or Firm*—Oblon, Spivak, McClelland, Maier & Neustadt, P.C.

[57] ABSTRACT

A polymer comprising polymeric units derived from an acrylate or methacrylate containing a polyfluoroalkyl group, polymeric units derived from an acrylate or methacrylate containing a blocked isocyanate group, and polymeric units derived from an acrylate or methacrylate containing a polyoxyalkylene chain.

10 Claims, No Drawings

ANTIFOULING AGENT

This application is a continuation of application Ser. No. 08/217,101, filed on Mar. 24, 1994, now abandoned.

The present invention relates to a polymer capable of exhibiting water and oil repellency and an antifouling agent comprising it as an effective component.

In recent years, it has been common to apply water and oil repellent treatment or antifouling treatment to clothings, and various compositions have been proposed depending upon the particular purposes. For example, in the cases of working clothes, rental sheets, etc., fluorine-type SR (soil release) treating agents are commonly employed which provide water and oil repellency for antifouling performance and a SR (soil release) property whereby any soil attached may readily be removed by e.g. washing. Such treatments are required to be highly durable against washing and dry cleaning, and various methods have been proposed to obtain such durability.

As such treating agents, there have been proposed a copolymer of a polyfluoroalkyl group-containing acrylate-acrylonitrile-a copolymerizable hydrophilic group-containing (meth)acrylate (Japanese Examined Patent Publication No. 18192/1978), a polyfluoroalkyl group-containing polymer having glycidyl methacrylate copolymerized as a crosslinking component (Japanese Unexamined Patent Publication No. 68006/1992), and a combination at the time of treatment of a polyfluoroalkyl group-containing polymer and a compound having a blocked isocyanate group. However, these treating agents still have problems such that no adequate durability has yet been obtained, or if satisfactory durability can be obtained, the cloth is likely to undergo yellowing or its texture tends to be hard. Thus, there has been no treating agent which is fully satisfactory.

It is an object of the present invention to provide a treating agent anew which is capable of providing high durability and which is free from a problem such as yellowing.

The present invention has been made to solve the above problems and provides a polymer comprising polymeric units derived from an acrylate or methacrylate containing a polyfluoroalkyl group, polymeric units derived from an acrylate or methacrylate containing a blocked isocyanate group, and polymeric units derived from an acrylate or methacrylate containing a polyoxyalkylene chain.

The present invention also provides an antifouling agent comprising such a polymer as an effective component.

The fluorine-type polymer of the present invention is a polymer which is capable of imparting water and oil repellency as well as an antifouling property and thus is useful as an effective component for the above-mentioned water and oil repellent treating agent or SR treating agent. These agents will be referred to generally as an antifouling agent hereinafter.

The fluorine-type antifouling agent of the present invention is made of a polymer comprising polymeric units of three specific (meth)acrylates. Further, it may contain one or more additional types of polymeric units of copolymerizable monomers (hereinafter referred to as comonomers) other than the polymeric units of the three specific (meth)acrylates. In the present specification, a (meth)acrylate represents both an acrylate and a methacrylate. Likewise, a (meth)acrylamide represents both an acrylamide and a methacrylamide.

The polyfluoroalkyl group-containing (meth)acrylate (hereinafter referred to as a $R_f$ (meth)acrylate) is a (meth)acrylate having at least one polyfluoroalkyl group (hereinafter referred to as a $R_f$ group). For example, the following compounds may be mentioned as preferred (wherein $R^1$ is a hydrogen atom or a methyl). Further, the polymer of the present invention may contain at least two types of polymeric units of $R_f$ (meth)acrylates. Particularly, it may contain at least two types of polymeric units of compounds wherein the carbon numbers of $R_f$ groups differ from one another.

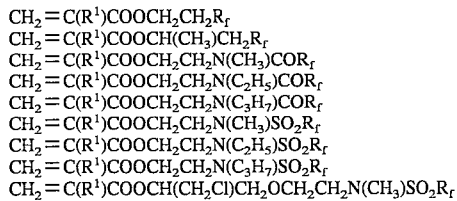

The $R_f$ group is a $C_{1-20}$, preferably $C_{4-16}$, linear or branched polyfluoroalkyl group, and it is common to select the one wherein the terminal portion is a perfluoroalkyl group. However, the one wherein the terminal portion contains a hydrogen atom or a chlorine atom, or an oxypolyfluoroalkylene-containing group, may also be useful. $R_f$ is preferably a perfluoroalkyl group of the formula $C_nF_{2n+1}$ wherein n is an integer of from 4 to 16, particularly preferably the one wherein n is from 6 to 12.

The blocked isocyanate group-containing (meth)acrylate is a (meth)acrylate having at least one blocked isocyanate group, and it is preferably a blocked product of an isocyanate group-containing (meth)acrylate, a blocked product of a reaction product obtained by reacting a hydroxyl group-containing (meth)acrylate with a polyisocyanate in such a ratio that at least one isocyanate group will remain, or a reaction product obtained by reacting a hydroxyl group-containing (meth)acrylate with a polyisocyanate derivative having at least one blocked isocyanate group and at least one free isocyanate group.

Instead of the above hydroxyl group-containing (meth)acrylate, it is possible to employ a (meth)acrylate having a functional group reactive with an isocyanate group other than a hydroxyl group, such as a primary amino group-containing (meth)acrylate. The average number of (meth)acryloyloxy groups in one molecule of the blocked isocyanate group-containing (meth)acrylate is preferably 1, and the average number of blocked isocyanate groups in one molecule is preferably from 1 to 2.

The isocyanate group-containing (meth)acrylate may, for example, be an isocyanate alkyl methacrylate such as 2-isocyanate ethyl methacrylate.

The hydroxyl group-containing (meth)acrylate is preferably an ester, particularly a monoester, of (meth)acrylic acid with a polybasic alcohol. The polybasic alcohol may, for example, be ethylene glycol, polyethylene glycol, propylene glycol, polypropylene glycol, 1,4-butanediol, glycerol, trimethylolpropanealkylenoxide adduct, or pentaerythritol.

The hydroxyl group-containing (meth)acrylate may, for example, be 2-hydroxyethyl (meth)acrylate, 2-hydroxypropyl (meth)acrylate, diethylene glycol mono(meth)acrylate, polypropylene glycol mono(meth)acrylate, poly(oxyethylene/oxypropylene) glycol mono(meth)acrylate, 3-chloro-2-hydroxypropyl (meth)acrylate, glycerol mono(meth)acrylate, or trimethyrolpropane mono(meth)acrylate.

The polyisocyanate may, for example, be an aromatic polyisocyanate such as 4,4'-diphenylmethane diisocyanate (MDI), tolylene diisocyanate (TDI) or tolidine diisocyanate, an aliphatic polyisocyanate such as hexamethylene diisocyanate or lysine diisocyanate, an alicyclic polyisocyanate such as isophorone diisocyanate, 4,4'-dicyclohexylmethane diisocyanate (hydrogenated MDI), cyclohexylene diisocyanate or bis(isocyanate methyl)cyclohexane (hydrogenated XDI), and their modification products such as nuleate modification products, prepolymer type modification products or viewlet modification products. Particularly preferred are an aliphatic polyisocyanate, an alicyclic polyisocyanate, a non-yellowing aromatic polyisocyanate such as xylylene diisocyanate or tetramethylxylylene diisocyanate, and their modification products. Most preferred are an aliphatic diisocyanate and an alicyclic diisocyanate.

To the above polyisocyanate, a (meth)acrylate having a functional group reactive with an isocyanate group, such as a hydroxylalkyl (meth)acrylate, is reacted and a blocking agent is reacted to obtain a (meth)acrylate having a blocked isocyanate group. The order of the two reactions is not particularly limited. Namely, a reaction product of a polyisocyanate having a free isocyanate group with a (meth)acrylate may firstly be prepared, and then the blocking agent may be reacted thereto. Otherwise, a part of isocyanate groups of a polyisocyanate may firstly be blocked and then a hydroxyalkyl (meth)acrylate may be reacted thereto.

Typical examples of the blocking agent include oximes, alkyl ketoximes, phenols, β-diketones, malonates, lactams and alkanols. Specifically, the blocking agent may, for example, be cyclohexane oxime, methyl ethyl ketoxime, phenol, cresol, acetyl acetone, diethyl malonate, isopropanol, t-butanol, ε-caprolactam, maleic acid imide or sodium bisulfite. Particularly preferred from the viewpoint of e.g. the decomposition temperature is a compound having a dissociation temperature of from 120° to 180° C. such as an oxime such as cyclohexane oxime, alkyl ketoxime such as methyl ethyl ketoxime, a lactam such as ε-caprolactam or a phenol such as phenol.

Specific compounds include, for example, a reaction product of isophorone diisocyanate/2-hydroxyethyl (meth)acrylate/methyl ethyl ketoxime [1/1/1] (the ratio in [ ] is a molar ratio, the same applies hereinafter), a reaction product of 4,4'-dicyclohexylmethane diisocyanate/2-hydroxyethyl (meth)acrylate/methyl ethyl ketoxime [1/1/1], a reaction product of isophorone diisocyanate/2-hydroxypropyl (meth)acrylate/methyl ethyl ketoxime [1/1/1], and a reaction product of 4,4'-dicyclohexylmethane diisocyanate/2-hydroxypropyl (meth)acrylate/methyl ethyl ketoxime [1/1/1].

The polyoxyalkylene chain-containing (meth)acrylate is a compound having a polyoxyalkylene chain such as a polyoxyethylene chain, polyoxypropylene chain, a Poly(oxyethylene/oxypropylene) chain or a polyoxybutylene chain and at least one, preferably only one, (meth)acryloyloxy group. Two or more polyoxyalkylene chains may be present per molecule. Further, the polyoxyalkylene chain may have a hydroxyl group at its terminal, and the hydroxyl group may be substituted by an alkoxy group or an acyloxy group (the other terminal is usually a (meth)acryloyloxy group).

The polyoxyalkylene chain has a chain of at least two oxyalkylene groups, preferably a chain of from 3 to 20 oxyalkylene groups. With respect to the oxyalkylene groups in the polyoxyalkylene chain, it is preferred that the majority is oxyethylene groups. A preferred polyoxyalkylene chain is a polyoxyethylene chain or a poly(oxyethylene/oxypropylene) chain wherein the majority is oxyethylene groups. Specific examples of such polyoxyalkylene chain-containing (meth)acrylates are shown below, but the present invention is not limited by such specific examples. The poly(oxyethylene/oxypropylene) chain may be a block copolymer chain or a random copolymer chain of oxyethylene groups and oxypropylene groups.

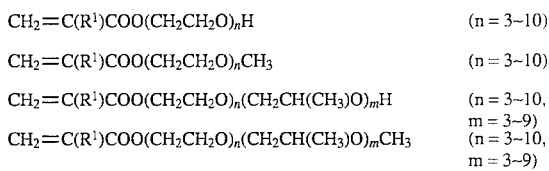

| | |
|---|---|
| $CH_2=C(R^1)COO(CH_2CH_2O)_nH$ | ($n = 3~10$) |
| $CH_2=C(R^1)COO(CH_2CH_2O)_nCH_3$ | ($n = 3~10$) |
| $CH_2=C(R^1)COO(CH_2CH_2O)_n(CH_2CH(CH_3)O)_mH$ | ($n = 3~10$, $m = 3~9$) |
| $CH_2=C(R^1)COO(CH_2CH_2O)_n(CH_2CH(CH_3)O)_mCH_3$ | ($n = 3~10$, $m = 3~9$) |

As the comonomers, (meth)acrylates or (meth)acrylamides other than those mentioned above, are preferred, but they are not limited thereto. As the comonomer, a long chain alkyl (meth)acrylate, particularly a long chain alkyl methacrylate, is preferred from the viewpoint of the solubility of the resulting copolymer. The long chain alkyl is preferably the one having from 6 to 20 carbon atoms. As other comonomers, olefins, halogenated olefins or styrenes, may, for example, be mentioned. Specific examples will be given below, but the comonomers are not limited to such specific examples:

Ethylene, vinyl acetate, vinyl chloride, vinyl fluoride, styrene, α-methylstyrene, p-methylstyrene, acrylic acid or its alkyl ester, methacrylic acid or its alkyl ester, (meth)acrylamide, diacetone (meth)acrylamide, methylol-modified (meth)acrylamide, N-methylol (meth)acrylamide, vinyl alkyl ether, halogenated alkyl vinyl ether, vinyl alkyl ketone, butadiene, isoprene, chloroprene, glycidyl (meth)acrylate, aziridinyl (meth)acrylate, benzyl (meth)acrylate, cyclohexyl (meth)acrylate, 2-ethylhexyl (meth)acrylate, maleic anhydride, (meth)acrylate having polysiloxane, and N-vinyl carbazole.

For the production of the polymer, the (meth)acrylate having a blocked isocyanate group is copolymerized preferably in an amount of from 0.1 to 10 wt %, more preferably from 0.5 to 5 wt %, based on the total monomers. If it is less than 0.1 wt %, the crosslinking effect tends to be inadequate, and it will be difficult to accomplish the object of the present invention. On the other hand, if it exceeds 10 wt %, the crosslinking tends to be too much, and it will be difficult to attain a high level of initial performance. The $R_f$ (meth)acrylate is copolymerized preferably in an amount of at least 20 wt %, more preferably at least 40 wt %, based on the total monomers. The (meth)acrylate containing a polyoxyalkylene chain is copolymerized preferably in an amount of from 5 to 70 wt %, more preferably from 10 to 55 wt %, based on the total monomers.

To obtain the polymer, various methods and conditions for the polymerization reaction can optionally be selected, and any one of various polymerization systems including bulk polymerization, suspension polymerization, emulsion polymerization, radiation polymerization and photopolymerization, may be employed. For example, a method may be employed wherein the monomer mixture is emulsified in water in the presence of e.g. a surfactant and polymerized with stirring. As the polymerization initiating source, a polymerization initiator such as an organic peroxide, an azo compound or a persulfate, or ionized radiation rays such as γ-rays, may be employed. As the surfactant, any one of various anionic, cationic and nonionic emulsifiers may be used. The polymer emulsion obtained by the emulsion polymerization may be used as an antifouling agent by itself or by diluting it with e.g. water.

Otherwise, the starting material monomers may be dissolved in a suitable organic solvent and subjected to solution polymerization by an action of a polymerization initiating source (such as a peroxide or an azo compound which is soluble in the organic solvent used). The solvent suitable for the solution polymerization may, for example, be a chlorine or fluorine type solvent such as trichlorotrifluoroethane, tetrachlorodifluoroethane or methylchloroform, methyl isobutyl ketone, methyl ethyl ketone, butyl acetate, or ethyl acetate. The polymer solution obtained by such solution polymerization may be used as an antifouling agent by itself or by diluting it with a solvent.

The polymerization is conducted at a temperature at which the blocked isocyanate group undergoes no substantial deblocking. Such a temperature is usually at least 20° C. lower than the dissociation temperature.

The present invention provides the above polymer or an antifouling agent composed of a composition such as a solution or an emulsion containing such a polymer as the effective component. The antifouling agent of the present invention can be formulated into an optional formulation such as an emulsion, a solvent solution or an aerosol in accordance with a conventional method after obtaining the polymer. Of course, the antifouling agent of the present invention may be a composition obtained directly by the above polymerization method, or its diluted or concentrated product. For example, an aqueous emulsion may directly be prepared by emulsion polymerization. Likewise, a solvent solution may directly be prepared by solution polymerization. As the antifouling agent of the present invention, an aqueous emulsion is preferred which has the above polymer of the present invention dispersed in an aqueous medium.

The antifouling agent of the present invention can be applied to the article to be treated by an optional method depending upon the type of the article to be treated or the formulation of the agent. For example, in the case of an aqueous emulsion or a solvent solution, a method may be employed wherein it is applied to the surface of the article to be treated by a known coating method such as dip coating, followed by drying. If necessary, curing may be conducted. The antifouling agent of the present invention may further contain other polymers than described above. Further, it may, of course, contain other water repellents or oil repellents, or an optional additive such as a crosslinking agent, an insecticide, a flame retardant, an antistatic agent or a wrinkle-preventive agent. By the above drying or curing, the blocked isocyanate groups in the polymer of the present invention are believed to be deblocked to form highly active isocyanate groups which in turn react to the surface of the article to be treated to form firm bonding, whereby a high level of durability can be accomplished.

The articles to be treated by the antifouling agent of the present invention are not particularly limited, and various examples may be mentioned. For example, they include fibers, fiber products such as woven fabrics or knitted fabrics, leathers and furs. The fiber products may be woven fabrics or knitted fabrics of animal or plant natural fibers such as cotton, hemp, wool or silk, synthetic fibers such as polyamide, polyester, polyvinyl alcohol, polyacrylonitrile, polyvinyl chloride or polypropylene, semi-synthetic fibers such as rayon or acetate, or mixed fibers thereof. Particularly preferred articles are fiber products.

Now, the present invention will be described in further detail with reference to Examples. However, it should be understood that the present invention is by no means restricted by such specific Examples.

In the following Examples, the water repellency, the oil repellency and the SR property were represented by the following evaluation standards.

Namely, the water repellency was represented by the repellency number (see Table 1) evaluated by the retention of an aqueous solution of isopropyl alcohol. With respect to the oil repellency, a few drops of the test solution as identified in Table 2 were placed at two locations (diameter: about 4 mm) on test cloth, and the oil repellency was evaluated by the state of penetration upon expiration of 30 minutes (AATCC-TM118-1966). The symbol+attached to the water repellency number or the oil repellency number indicates that the performance in question is slightly better.

TABLE 1

| Repellency No. | State |
| --- | --- |
| 100 | No wettability observed on the surface |
| 90 | Slight wettability was observed on the surface |
| 80 | Partial wettability was observed on the surface |
| 70 | Substantial wettability was observed on the surface |
| 50 | Wettability was observed on the entire surface |
| 0 | Both sides were completely wetted |

TABLE 2

| Oil repellency | Test solution | Surface tension |
| --- | --- | --- |
| 8 | n-heptane | 20.0 |
| 7 | n-octane | 21.8 |
| 6 | n-decane | 23.5 |
| 5 | n-dodecane | 25.0 |
| 4 | n-tetradecane | 26.7 |
| 3 | n-hexadecane | 27.3 |
| 2 | mixed solution of 65 parts of nujole/35 parts of hexadecane | — |
| 1 | nujole | 31.2 |
| 0 | less than 1 | — |

The SR property was evaluated in accordance with the following method employing heavy oil A.

Test method for the SR property (1) using a pipet, heavy oil A was dropped on a test cloth so that the diameter would be about 5 mm.

(2) The heavy oil A was then spread on the test cloth by a spatula.

(3) The test cloth was left to stand for 4 hours under the above condition.

(4) The test cloth was washed with a household washing machine.

(5) The degree of removal of the heavy oil A was visually evaluated. The SR property was determined in accordance with Table 3 depending upon the degree of the removal.

TABLE 3

| SR property No. | State |
| --- | --- |
| 5 | The stain was completely removed. |
| 4 | The stain was not completely removed and slightly remained. |
| 3 | The profile of the stain was vague, but the degree of removal was low. |
| 2 | The profile of the stain was clear. |
| 1 | The stain was not substantially removed, and the color of heavy oil A was clearly observed. |
| 0 | The stain was not removed at all. |

PREPARATION EXAMPLE 1

Into a four-necked glass flask equipped with a reflux condenser, a thermocouple thermometer and a stirrer, 130 g (1 mol) of hydroxyethyl methacrylate, ( hereinafter referred to as HEMA) was charged, and 222.3 g (1 mol) of isophorone diisocyanate was further added thereto. The mixture was heated to 80° C. in a nitrogen stream and maintained at that temperature for 3 hours. After stirring the mixture for one hour, it was confirmed by titration that 50% of the isocyanate was consumed. Further, 87 g (1 mol) of methyl ethyl ketoxime was dropwise added thereto, and the reaction was continued for two hours. Then, it was confirmed by IR that the absorption by the isocyanate group completely disappeared. By the above reaction, 439 g of a blocked isocyanate-containing methacrylate was obtained. This product will be hereinafter referred to as BMA-X.

PREPARATION EXAMPLE 2

Into a four-necked glass flask equipped with a reflux condenser, a thermocouple thermometer and a stirrer, 130 g (1 mol) of HEMA was charged, and 262 g (1 mol) of hydrogenated MDI was further added thereto. The mixture was heated to 80° C. in a nitrogen stream and maintained at the same temperature for 3 hours. Further, 113 g of ε-caprolactam was dropwise added thereto, and the reaction was continued for two hours. Then, it was confirmed by IR that the absorption by the isocyanate group completely disappeared. By the above reaction, 505 g of a blocked isocyanate-containing methacrylate was obtained. This product will be hereinafter referred to as BMA-Y.

PREPARATION EXAMPLE 3

Into a four-necked glass flask equipped with a reflux condenser, a thermocouple thermometer and a stirrer, 130 g (1 mol) of HEMA was charged, and 174 g (1 mol) of TDI was further added thereto. The mixture was heated to 80° C. in a nitrogen stream and maintained at the same temperature for two hours. Further, 87 g of methyl ethyl ketoxime was dropwise added thereto, and the reaction was continued for two hours. Then, it was confirmed by IR that the absorption by the isocyanate group completely disappeared. By the above reaction, 390 g of a blocked isocyanate-containing methacrylate was obtained. This product will be hereinafter referred to as BMA-Z.

EXAMPLE 1

Into a glass autoclave (internal capacity: 1 l) equipped with a thermocouple thermometer and an electrical stirrer, 120 g (60 parts by weight) of perfluoroalkylethyl acrylate (hereinafter referred to as FA) [$R_fCH_2CH_2OCOCH=CH_2$, average number of carbon atoms in the $R_f$ group is about 9], 2 g (1 part by weight) of BMA-X, 78 g (39 parts by weight) of polyoxyethylene glycol monomethacrylate [$CH_2=C(CH_3)COO(CH_2CH_2O)_9H$, hereinafter referred to as PEGMA], 350 g (175 parts by weight) of water, 350 g of isopropyl alcohol and 1 g of azobisisobutyronitrile (AIBN) were added, and the autoclave was flushed with nitrogen for about 20 minutes. Then, the temperature was raised to 60° C. to initiate the polymerization. The mixture was maintained at 60° C. for 15 hours with stirring and then cooled to obtain 645 g of an emulsion having a solid content concentration of 31%. The conversion was 99.0% to 99.8% (based on FA). The yield of the stabilized emulsion based on the total monomers reacted, was from 95% to 99%.

EXAMPLE 2

Into a glass autoclave (internal capacity: 1 l) equipped with a thermocouple thermometer and an electrical stirrer, 120 g (60 parts by weight) of FA, 4 g (2 parts by weight) of BMA-Y, 76 g (38 parts by weight) of poly(oxyethylene/oxypropylene) glycol monomethacrylate [$CH_2=C(CH_3)COO(CH_2CH_2O)_7(CH_2CH(CH_3)O)_3H$, hereinafter referred to as PEPGMA], 120 g (60 parts by weight) of water, 350 g of dipropylene glycol monomethyl ether (DPGMME) and 6 g of AIBN were added, and the autoclave was flushed with nitrogen for about 20 minutes with stirring. Then, the temperature was raised to 60° C. to initiate the polymerization. The mixture was maintained at 60° C. for 20 hours with stirring and then cooled to obtain a slightly yellow solution having a solid content concentration of 31%. The conversion by the copolymerization reaction as measured by gas chromatography was from 99.0% to 99.8% (based on FA).

EXAMPLES 3 AND 4

In the same manner as in Example 2, polymerization was conducted by changing the monomers. The types and amounts of the monomers and the amounts of water, DPGMME and AIBN used, are shown in Table 4.

TABLE 4

| Example 3 | | Example 4 | |
| --- | --- | --- | --- |
| Feed materials | Parts by weight | Feed materials | Parts by weight |
| FA | 120 | FA | 140 |
| BMA-Z | 4 | BMA-Z | 4 |
| PEGMA | 76 | PEPGMA | 56 |
| Water | 120 | Water | 120 |
| DPGMME | 350 | DPGMME | 350 |
| AIBN | 2 | AIBN | 4 |

COMPARATIVE EXAMPLE 1

Polymerization was conducted in the same manner as in Example 1 except that BMA-X was not copolymerized, to obtain an emulsion having a solid content concentration of 30%.

COMPARATIVE EXAMPLE 2

Polymerization was conducted in the same manner as in Example 2 except that BMA-Y was not copolymerized, to obtain a slightly yellow solution having a solid content concentration of 30%.

Each of the emulsions thus obtained was diluted with the medium for polymerization to obtain a latex having a solid content concentration of 20 wt %, and using the latex as the stock solution, the water repellency and the oil repellency were tested. The latex stock solution was diluted with water so that the proportion of the stock solution to water would be 1.5 wt %, whereupon the water repellency and the oil repellency were measured.

The test was conducted using a mixed spun broad cloth of polyester fibers/cotton (weight ratio: 65/35), and the water and oil repellency treatment was conducted as follows. Namely, the test cloth was immersed into the treating solution diluted as described above, and the cloth was squeezed between a pair of rubber rollers, so that the wet pickup would be 50 wt %. Then, it was dried at 110° C. for 90 seconds and further subjected to heat treatment at 170° C. for 60 seconds. For the washing durability, JIS-L-0217 103 method was repeated five times and the cloth was dried at 90° C. for 3 minutes and then subjected to the test. With respect to the test cloth thus obtained, the water repellency, the oil repellency and the SR property were measured, and the results are shown in Table 5.

TABLE 5

|  | Before washing | | | After washing | | |
| --- | --- | --- | --- | --- | --- | --- |
|  | Water repellency | Oil repellency | SR property | Water repellency | Oil repellency | SR property |
| Example 1 | 80 | 6 | 4 | 80 | 5 | 3+ |
| Example 2 | 80 | 5 | 4 | 80 | 4 | 4 |
| Example 3 | 80 | 6 | 4 | 70 | 5 | 3+ |
| Example 4 | 80 | 6 | 4 | 70 | 4 | 3+ |
| Comparative Example 1 | 80 | 6 | 4 | 50 | 1 | 2 |
| Comparative Example 2 | 80 | 6 | 4 | 50 | 1 | 1 |

By the fluorine type antifouling agent comprising the copolymer of the present invention as an effective component, a high level of durability can be accomplished which has not been accomplished before.

What is claimed is:

1. An antifouling agent comprising as an effective component, a polymer consisting essentially of polymeric units derived from an acrylate or methacrylate monomer containing a polyfluoroalkyl group, polymeric units derived from an acrylate or methacrylate containing a blocked isocyanate group, and polymeric units derived from an acrylate or methacrylate containing a polyoxyalkylene chain, wherein the proportion of the polymeric units derived from an acrylate or methacrylate containing a polyfluoroalkyl group is at least 20 wt %, the proportion of the polymeric units derived from an acrylate or methacrylate containing a blocked isocyanate group is from 0.1 to 10 wt %, and the proportion of the polymeric units derived from an acrylate or methacrylate containing a polyoxyalkylene chain is from 5 to 70 wt %.

2. The polymer according to claim 1, wherein the proportion of the polymeric units derived from an acrylate or methacrylate containing a blocked isocyanate group is from 0.5 to 5 wt % based on the total monomers.

3. The polymer according to claim 1, wherein the polyfluoroalkyl group is a perfluoroalkyl group of the formula $C_nF_{2n+1}$ wherein n is an integer of from 4 to 16.

4. The polymer according to claim 1, wherein the acrylate or methacrylate containing a blocked isocyanate group is a compound obtained by blocking with a blocking agent an isocyanate group of a reaction product obtained by reacting an acrylate or methacrylate containing a hydroxyl group with a polyisocyanate in such a ratio that at least one isocyanate group will remain.

5. The polymer according to claim 4, wherein the polyisocyanate is at least one polyisocyanate selected from the group consisting of aliphatic polyisocyanates and alicyclic polyisocyanates.

6. The polymer according to claim 1, wherein the blocked isocyanate group is an isocyanate group blocked with an alkylketoxime.

7. The polymer according to claim 1, wherein the polyoxyalkylene chain in the acrylate or methacrylate containing the polyoxyalkylene chain, has from 3 to 20 oxyalkylene groups, the majority of which are oxyethylene groups.

8. The antifouling agent according to claim 1, wherein the antifouling agent is coated on the surface of a fiber product to impart an antifouling property.

9. An antifouling composition which is an aqueous emulsion having the polymer as defined in claim 1, dispersed in an aqueous medium.

10. The antifouling composition according to claim 9, wherein the antifouling composition is coated on the surface of a fiber product to impart an antifouling property.

* * * * *